United States Patent [19]
Kelly

[11] Patent Number: 4,534,159
[45] Date of Patent: Aug. 13, 1985

[54] APPARATUS FOR FORMING, FILLING AND SEALING BAGS WITH FLUID CONTENTS

[75] Inventor: Robert C. Kelly, Houston, Tex.

[73] Assignee: General Packaging Equipment Company, Houston, Tex.

[21] Appl. No.: 441,088

[22] Filed: Nov. 12, 1982

[51] Int. Cl.³ .............................................. B65B 9/08
[52] U.S. Cl. ........................................ 53/552; 53/373; 53/451
[58] Field of Search ................. 53/373, 450, 451, 469, 53/479, 550, 551, 552, 554

[56] References Cited

U.S. PATENT DOCUMENTS 2,732,988  1/1956  Feinstein ............................... 53/373
2,751,732  6/1956  Woppman .............................. 53/554

Primary Examiner—Robert L. Spruill
Assistant Examiner—Michael D. Folkerts
Attorney, Agent, or Firm—Bill B. Berryhill

[57] ABSTRACT

Method and apparatus for forming, filling and sealing bags from a continuous supply of bagging material, the apparatus including a pair of sealing jaws transversely movable toward each other to engage the bagging material to form a transverse seal providing the top closure for a filled bag and the bottom closure for a succeeding bag. The improvement includes stretch assemblies attached to the sealing jaws and engageable with the bagging material at opposite edges thereof to provide opposing forces in directions perpendicular to the movement of the sealing jaws to flatten the bag and remove any wrinkles therefrom prior to sealing of the bags by the sealing jaws.

8 Claims, 4 Drawing Figures

APPARATUS FOR FORMING, FILLING AND SEALING BAGS WITH FLUID CONTENTS

BACKGROUND OF THE INVENTION

1. Field of the Invention

The present invention pertains to methods and apparatus for forming, filling and sealing bags or packages with various materials. Specifically, it pertains to methods and apparatus for forming, filling and sealing bags or packages with fluid materials.

2. Description of the Prior Art

One of the most modern types of processing machinery for filling bags, packages, pouches, etc., with dry particulate products or with liquid products is a machine referred to as the vertical form-fill-seal machine. With these machines, a flat continuous roll of bagging material may be formed into a tube, sealed at the bottom, filled and then sealed at the top. Examples of such machines may be seen in U.S. Pat. Nos. 3,826,061; 3,849,965; 4,077,308 and 4,090,344.

In such a vertical form-fill-seal (VFFS) machine, a flat sheet of packaging material is first formed into a tube or hose by automatically shaping the bagging material into a tube or hose, bringing the edges of the sheet together and longitudinally sealing the bagging material at this juncture. A pair of sealing jaws are provided in the machine which are transversely movable toward each other to engage the bagging material, after it is in the shape of a hose or tube, to form a transverse seal providing the top closure for a lower bag and a bottom closure for a succeeding upper bag. The material to be placed in the bag is measured and introduced into the upper or succeeding bag and the bagging material advanced by the sealing jaws or some other mechanism, and the sealing jaws are released from its sealing position, repositioned and moved toward each other to again engage the bagging material, forming a transverse seal providing the top closure of the filled bag and the bottom closure of still another succeeding bag.

VFFS machines have long been used to package dry products in both small sizes and large bags, e.g. five and ten pound bags. However, VFFS machines have not been used to package liquids in sizes larger than one liter or one quart. There is a significant problem inherent in attempting to package liquids as opposed to packaging dry products.

Since the upper and lower ends of the bags are flat when they are sealed together, it is necessary that the tube or hose from which they are formed be flat before or as the sealing jaws are brought together. Dry products help hold the bagging material flat since friction between particles restricts the flow of the product. In addition, mechanical means may also be used. Such mechanical means include flattening tubes, spreader wires and deflater pads.

Since liquids flow to equalize pressure, a tube or hose of bagging material filled with liquid tends to assume a rounded cross-section. When the tube of bagging material is flattened for sealing, the force of the liquid resisting flattening increases to resist such flattening. As the sealing jaws close on the tube of bagging material as it hangs filled with liquid, and there is no control over how the tube moves as it becomes flat, there is very likely to be wrinkles in the seal areas. This will likely produce leaking bags resulting in the loss of the liquid product and creating other problems even in the bags which are sealed.

Various means have been developed to overcome the problems inherent in sealing of bags filled with liquids. For example, in U.S. Pat. No. 3,849,965, a pair of wedges are provided below the sealing jaws of a machine which serve to change the volume of a chamber formed by lateral plates placed on both sides of the hose or tube of bagging material. These wedges also appear to provide a mechanical means of aiding in flattening of the hose or tube of bagging material as it is being sealed by the sealing jaws. However, it appears that such an arrangement would not completely eliminate the wrinkling in the seal area associated with filling bags with liquid, particularly larger size bags. Thus, while the VFFS machine has been widely used for filling bags with dry products, wrinkling in the seal area associated with filling bags with liquid materials has prevented widespread use of the VFFS machine in such applications.

SUMMARY OF THE INVENTION

In the method and apparatus of the present invention a VFFS machine is utilized for the forming, filling and sealing of bags or packages filled with fluid materials. The method and design of such a machine has been improved to eliminate the wrinkling problem associated with the filling of bags or packages with liquid materials. In the improved method and apparatus of the present invention, as in the prior art, a hose or tube of bagging material is formed from a continuous supply of bagging material, the longitudinal edges of the bagging material being sealed, and the bottom portion of the bagging material is sealed by sealing jaws to form a top opened bag in communication with a source of liquid product. The liquid product is measured and dispensed to the bag, sealing jaws are actuated then to provide the top closure for a filled bag and the bottom closure for a succeeding unfilled bag. The bags are separated in a conventional manner.

The improvement provided by the present invention is the provision of first and second pairs of stretch assemblies at each end of the sealing jaws having engagement surfaces thereon engageable with the bagging material, as the pair of sealing jaws move toward each other, so that a first edge of the bagging material is gripped between the engagement surfaces of the first pair of stretch assemblies and a second and opposite edge of the bagging material is gripped between the engagement surfaces of the second pair of stretch assemblies, the engagement surfaces of the first and second pairs of stretch assemblies being forced outwardly in opposite directions perpendicular to the movement of the sealing jaws to provide opposing forces in directions perpendicular to the movement of the sealing jaws to flatten the bag and remove any wrinkles therefrom prior to sealing by the sealing jaws. The first and second pairs of stretch assemblies may be disposed slightly above the transverse sealing line of the sealing jaws and in addition, third and fourth pairs of stretch assemblies may be disposed slightly below the transverse centerline of the sealing jaws operating in the same manner.

Each of the stretch assemblies may comprise a pair of parallel finger members, the first ends of which are pivotally attached or mounted in a fixed relationship with one of the pair of sealing jaws and the second ends of which are pivotally attached to a member on which the engagement surface is provided so as to allow each of the engagement surfaces to move outwardly upon gripping of the bagging material between the engagement surfaces of respective pairs of stretch assemblies. Engagement surfaces of the stretch assemblies are engageable with the bagging material prior to engagement of the sealing jaws with the bagging material, so that the opposing forces in directions perpendicular to the movement of the sealing jaws are applied to flatten the bag prior to sealing of the bag by the sealing jaws.

Thus, the improved apparatus and method of the present invention provides a method to flatten the unsealed bagging material to remove any wrinkles therefrom prior to sealing by the sealing jaws. This eliminates leakage and contaminating problems inherent in VFFS machines of the prior art. Other objects and advantages of the invention will be apparent from the description which follows in conjunction with the accompanying drawings.

DESCRIPTION OF THE PREFERRED EMBODIMENT

Figure 1:
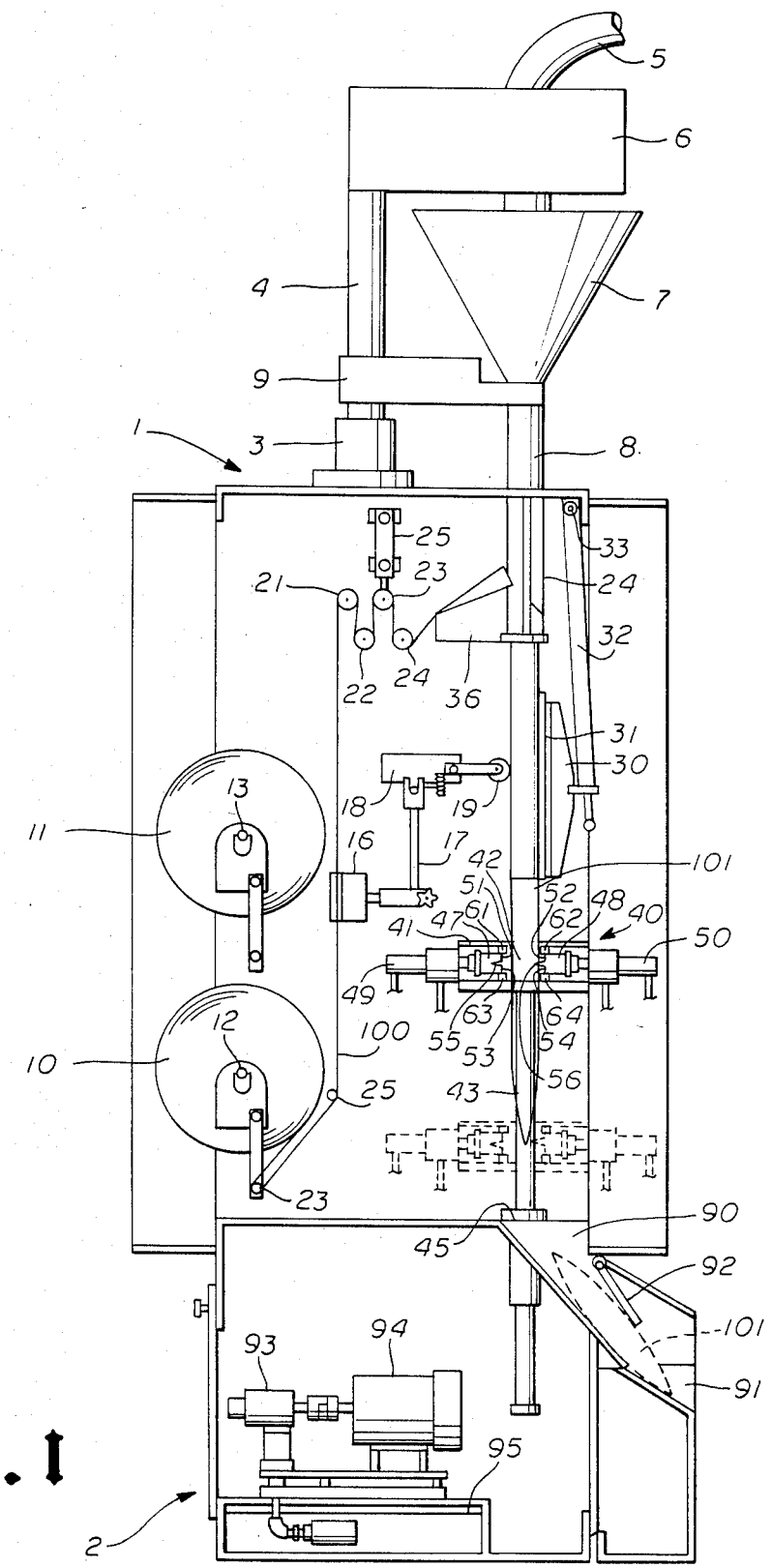
FIG. 1 is a side elevation view of a VFFS machine of the type utilized in a preferred embodiment of the invention.

Referring first to FIG. 1, there is shown a vertical form-fill-seal (VFFS) machine for forming, filling and sealing bags or packages with a liquid product. The machine comprises a main housing 1 having a base area 2 in which various power and control components may be mounted. Other control components may be enclosed in a control housing (not shown). Surmounted on the housing 1 by a pedestal 3 and column 4 are various components for dispensing fluid product from a central supply source (not shown). These components may include a supply conduit 5, various pumps and/or measuring devices generally represented at 6 and a pouring funnel or spout 7 attached to a filler tube 8. The pouring funnel 7 may be supported on the column 4 by a cantilever mount 9. The components for supplying liquid product are shown for general purposes and general illustration only, it being understood that various types of fluid metering and measuring components may be used.

Mounted in the housing 1 is at least one roll 10 of flat sheet bagging material of any suitable type; e.g. polyethylene and other soft films. If desired, an additional roll 11 may be provided as a back-up or spare. The bagging material rolls 10 and 11 are carried on spindles and shafts 12 and 13 which are in turn supported at their opposite ends by bearing blocks (not shown).

Also mounted in the housing 1 adjacent the material rolls 10 and 11 is a photoelectric register device 16, the purpose of which will be more fully understood hereafter. For the present time, it is sufficient to note that the register device 16 is mounted on a rod 17 for limited vertical adjustment thereon. Directly above the rod 17 is a force reaction unit 18 at the end of which is mounted a reaction wheel 19. During some steps of the method of the present invention the force reaction unit 18 is in the position shown in FIG. 1 so that wheel 19 bears against the filler tube 8 when any opposing force is brought to bear on the opposite side of the filler tube 8. The force reaction unit 18 is pivotally mounted and during other steps of the method it is caused to pivot to another position so that the wheel 19 does not engage or bear against filler tube 8.

Directly above the force reaction unit 18 is a series of cylindrical idler bars 21, 22, 23, and 24. The axes of these idler bars, except for 23, are essentially fixed. However, the idler bar 23 is attached to hydraulic cylinders 25 so that its axis can be vertically displaced.

Also supported in the housing 1 is a backseal bar 30 which may be provided with a heating element 31, the purpose of which will be more fully understood hereafter. The backseal bar 30 is mounted on a rod 32 for pivoting about axis 33 so that the backseal bar 30 can move from the position shown, in contact with tube 8, to a position away from the tube 8. Pivoting of rod 32 is provided by mounting the rod on a rotating shaft, whose axis coincides with pivot axis 33. The shaft extends horizontally to the side of the housing 1 where another rod (not shown) is attached for projection to and connection with the rod of a hydraulic piston unit (not shown). The axis of the piston unit is horizontal and it should be understood that actuation of the piston unit will cause pivoting of rod 32 about the axis 33.

Mounted in the housing 1 above the backseal bar 30 and essentially surrounding the filler tube 8 is a forming head or former 36. The former 36 is well known in the VFFS machine art and will not be described in detail, although its operation will be explained hereafter.

Directly below the filler tube 8 is a sealing jaw assembly 40. The jaw assembly 40 includes an oval frame 41 having an elongated vertical opening 42 therethrough. The frame 41 is supported at opposite ends by vertical rods 43 which pass through bearing hubs 45. The rods 43 are reciprocal within the bearing hubs 45 so that the jaw assembly 40 can move from a lower terminal position represented by dotted lines in FIG. 1, to an upper terminal position just slightly below the lower end of the filler tube 8. The rods 43 can be moved in any suitable manner as is known in the art, e.g. hydraulic pistons, crank mechanisms, etc.

Mounted in the jaw frame 41 is a pair of opposing jaws 47 and 48 for reciprocal movement by hydraulic cylinders 49 and 50 toward and away from each other. Each jaw 47 and 48 is provided with horizontal upper sealing surfaces 51 and 52, lower sealing surfaces 53 and 54 and knife surfaces 55 and 56 respectively. The operation of the jaws 47 and 48 will be move fully described hereafter.

Figure 2:
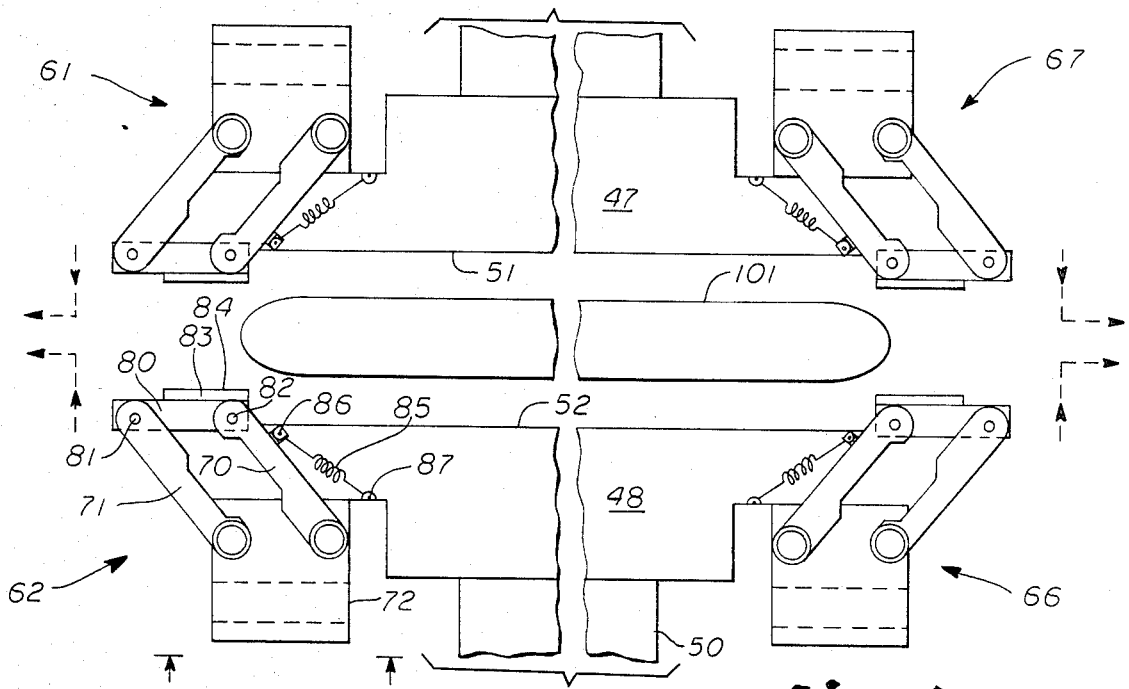
FIG. 2 is a horizontal cross-sectional view of the stretch assemblies of a preferred embodiment of the invention, showing the disposition of the stretch assemblies prior to engagement with the bagging material.
Figure 3:
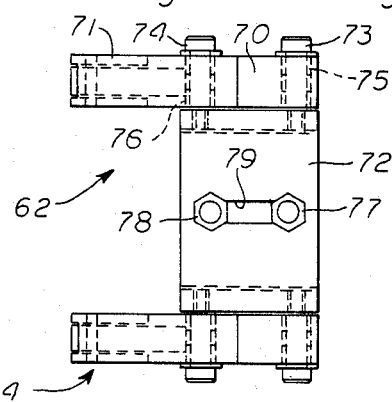
FIG. 3 is a partial elevation view of one of the stretch assemblies of FIG. 2, taken along line 3—3 of FIG. 2.
Figure 4:
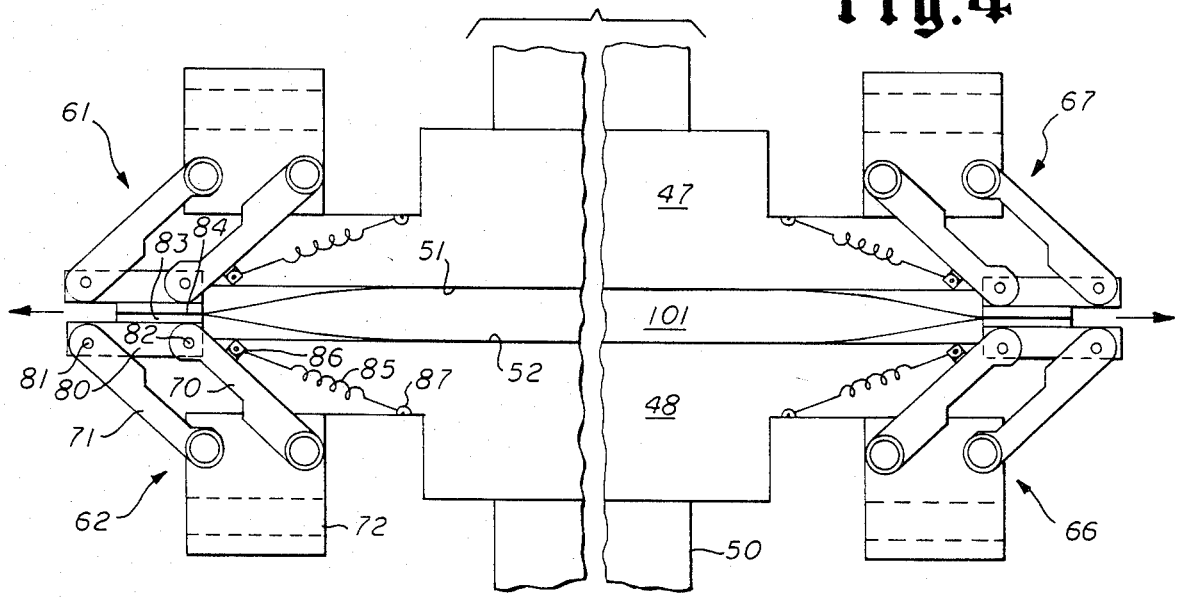
FIG. 4 is a cross-sectional view similar to FIG. 2 but showing the disposition of the stretch assemblies after engagement with the bagging material, but prior to full engagement of the sealing jaws.

Affixed to the jaws 47 and 48 are stretch assemblies 61, 62, 63, 64, etc. These stretch assemblies are in pairs as are the jaws 47 and 48, stretch assembly 61 and 62 being a pair and stretch assembly 63 and 64 being a pair. There are also corresponding pairs at the opposite end of the jaws 47 and 48. Referring also to FIGS. 2, 3, and 4, a more complete description of the stretch assemblies will be given. In FIG. 2 is shown a first pair of stretch assemblies 61, 62 and a second pair of stretch assemblies 66, 67 at opposite ends of the sealing jaws 47 and 48. In FIG. 2, the faces or sealing surfaces 51 and 52 of the sealing jaws 47 and 48 are shown prior to engagement with bagging material 101 shown therebetween.

The components of stretch assembly 62 will be described in detail, it being understood that the components of the other stretch assemblies 61, 63, 64, 65, 66, 67, etc. are essentially the same. Each stretch assembly comprises a pair of parallel finger members 70 and 71 pivotally attached to a mounting block 72 by shoulder screws 73 and 74 which are surrounded by tubular nylon inserts 75 and 76. The mounting block 72 is fixed relative to the jaw 48 and may actually be attached thereto by attachment means such as shoulder screws 77 and 78, which pass through an elongated slot 79 provided in the mounting block 72. It will be noted that this allows limited adjustment of the stretch assembly 62 in a direction perpendicular to the movement of the sealing jaws 47 and 48. The second ends of the finger members 70 and 71 may be pivotally attached to an engagement shoe or plate 80 by pins 81 and 82. The shoe 80 may be a metallic member adapted to receive an engagement insert 83 made of a material such as rubber or any other material having a high friction coefficient. The face 84 of the engagement member 83 is essentially parallel to the sealing surface 51 and 52 of the sealing jaws 47 and 48. Since the finger members 70 and 71 are parallel at all times, the engagement face 84 will remain parallel with the sealing surfaces 51 and 52 and perpendicular to the movement of the jaws 47 and 48 at all times.

Biasing means is provided for each of the stretch assemblies so that the engagement members 83 of the first pair of stretch assemblies 61, 62 and the second pair of stretch assemblies 66, 67 will be biased inwardly toward each other. In the embodiment shown in FIG. 2, this biasing means is provided by a spring member 85 one end of which is attached by a bracket and screw 86 to finger member 70 and the opposite end of which is fixed at 87 to the jaw member 48.

As mentioned above, all of the stretch assemblies are similar to stretch assembly 62. It can also be seen that the first and second pairs of stretch assemblies 61, 62 and 66, 67 are disposed slightly above the transverse centerline of the sealing jaws 47 and 48. Third and fourth stretch assemblies 63, 64, etc. may be disposed slightly below the transverse centerline of the sealing jaws 47 and 48. In fact, the lower pairs of stretch assemblies may utilize common mounting blocks. For example, in FIG. 3, it will be seen that the lower stretch assembly 64 utilizes the mounting block 72 of the upper stretch assembly 62.

Referring again to FIG. 1, it will be seen that directly below the opening 42 of the jaw assembly 40 is a chute 90 which connects with an outlet 91. A hinged gate 92 may be provided between the chute 90 and outlet 91. The base 2 of the housing 1 may provide space for components such as a hydraulic pump 93, motor 94 and hydraulic reservoir 95. These components may provide the hydraulic power necessary for operation of the various components of the machine, including the hydraulic cylinders 49 and 50 which move the sealing jaws 47 and 48 toward and away from each other. Other hydraulic, pneumatic or electrical powered control components may be mounted in the base 2 or in the other housings provided therefor.

Referring now to all of the drawings, the method of the present invention will be described. Initially, the leading edge of film 100 is unrolled from the material roll 10, fed around idler bars 23, 25, through the photoelectric register 16. The purpose of the register 16 is to assure that printed material on the film 100 will be properly aligned as bags are formed out of the film 100. To assure this, a registration index is provided on the film which when sensed by the register 16 will stop the movement of the film 100 at proper points within the cycle to assure that the printing will appear as desired on the finished bags which are filled with liquid products.

From the register 16, the film 100 is fed around idler bars 21, 22, 23, and 24 as indicated. These idler bars, particularly 23, assure that proper tension is maintained on the film during the process. From the last idler bar 24, the film enters the former 36 where its outer edges are brought together, in a fashion known in the art, around the filler tube 8, slightly overlapping each other and forming a film, tube or hose around the filler tube 8. At appropriate times, the backseal bar 30 and its heating element 31 are pressed against the longitudinal seam formed by the overlapping of the film edges and heat is applied to seal these edges together. Depending upon the type of packaging material being used, the sealing may be accomplished by impulse heating or static heating. As pressure is applied to the film tube and the filling tube 8, the force reacts against wheel 19 of the reaction unit 18 so that the force is offset preventing damage to or misalignment of the filler tube 8.

Once operation has commenced, and at approximately the same time that the longitudinal seam is being sealed, the jaw assembly 40 is moved to its upper terminal position and the jaws 47 and 48 are moved inwardly toward the film tube suspended from filler tube 8. As the sealing jaws 47 and 48 move toward the film tube or bagging material 100 suspended from filler tube 8, a portion of the bagging material 101 (to become a bag) is first engaged by the engagement faces (84 as with stretch assembly 62) of the stretch assemblies 61, 62, 63, 64, 65, 66, 67, etc. Thus, a first edge of the bagging material 101 is gripped between the engagement means of a first pair of stretch assemblies 61 and 62 and a second and opposite edge of the bagging material 101 is gripped between the engagement means of the second pair of stretch assemblies 66, 67. As the jaws 47, 48 move closer together, e.g. as in FIG. 4, the first and second pair of stretch assemblies further grip the bagging material 101 as they are forced outwardly in opposite directions perpendicular to the movement of the jaws 47 and 48. As this occurs, opposing forces are applied to the bagging material in directions perpendicular to the movement of the sealing jaws, flattening the bagging material 101 and removing an wrinkles therefrom prior to sealing the sealing jaws 47 and 48. Movement of the jaws 48, 48 and the stretch assemblies continues in this manner until the sealing surfaces 51 and 52 engage the bagging material 101, finally arresting movement of the jaws 47, 48. At this point, heat is applied through the sealing surfaces 51 and 52 to the bagging material 101 so that the bottom of the bag is sealed and created thereby. It is noted that at the same time the upper stretch assemblies (first and second pairs) engage the bagging material 101 above the transverse centerline of the jaws 47 and 48, the lower stretch assemblies (third and fourth pairs) correspondingly engage the edges of the bagging material 101 below the transverse centerline of the jaws 47 and 48.

At about this time in the cycle, the backseal bar 30 is pivoted away from filler tube 8 and the film 100 and newly formed bag 101 are pulled downwardly by the jaw assembly 40 (through piston rods 43) essentially to the dotted line position shown in FIG. 1. As the bag 101 is pulled downwardly, the feeding and measuring apparatus 6 is actuated, causing liquid products to be dispensed through the filler tube 8 into the bag 101. The bag is filled the proper amount and flow of fluids terminated. At about this point of time, the jaws 47 and 48 are retracted and the jaw assembly 40 moved upwardly again to its upper terminal position. Then the jaws 47 and 48 are moved inwardly to engage the film 100 at the top of bag 101 and the bottom of the next to be formed bag. The top of bag 101 is sealed by sealing surfaces 53 and 54 while the knife surfaces 55 and 56 actually separate the film between the top of the bag 101 and the bottom of the next to be formed bag. The bottom of the next to be formed bag is sealed by the sealing surfaces 51 and 52.

As in a previously described step, the engagement means of the stretch assembly pairs engage the bagging material prior to engagement by the jaws 47 and 48. As this occurs, opposing forces in directions perpendicular to the movement of the sealing jaws are applied to flatten the bagging material and remove any wrinkles therefrom prior to sealing by the sealing jaws. While the jaw assembly remains engaged with the bagging material, the assembly 40 is returned to the lower terminal position of FIG. 1 (dotted line). This causes the bagging material to be advanced suspending another bag beneath the filler tube 8 for filling with fluid products. The jaws 47 and 48 are retracted and the sealed bag 101 (dotted line) falls into the chute 90 for further handling. The cycle continues forming, filling and sealing bag after bag of fluid product.

Although many components of the just described machine and several steps of the method are known in the art, the stretch assemblies and methods of providing opposing forces to the bagging material to remove any wrinkles therefrom prior to sealing is a substantial improvement which is unique in the art. Such apparatus and method permits packaging of fluid products with a VFFS machine not heretofore possible or possible only with reduced reliability.

Although a preferred embodiment of the invention has been described herein, many variations thereof can be made by those skilled in the art without departing from the spirit of the invention. Therefore, it is intended that the scope of the invention be limited only by the claims which follow.

I claim:

1. Improved apparatus for forming, filling and sealing bags from a continuous supply of bagging material including a pair of sealing jaws transversely movable toward each other to engage said bagging material to form a transverse seal providing the top closure for a filled bag and a bottom closure for a succeeding bag, said improvement comprising stretch means attached to said sealing jaws, at opposite ends thereof, and engageable with opposign edges of said bagging material to provide opposing forces in directions perpendicular to the movement of said sealing jaws to flatten said bag and remove any wrinkles therefrom prior to said sealing by said sealing jaws, said stretch means comprising first and second pairs of stretch assemblies at each end of said pair of sealing jaws having engagement means thereon engageable with said bagging material, as said pair of sealing jaws move toward each other, so that a first edge of said bagging material is gripped between the engagement means of said first pair of stretch assemblies and a second and opposite edge of said bagging material is gripped between the engagement means of said second pair of stretch assemblies, said engagement means of said first and second pairs of stretch assemblies being forced outwardly in opposite directions perpendicular to said movement of said jaws to provide said opposing forces to said bagging material, each of said stretch assemblies comprising a pair of parallel finger members the first ends of which are pivotally attached to mounting means stationarily fixed relative to one of said pair of sealing jaws and the second ends of which are pivotally attached to said engagement means so as to allow each of said engagement means to move outwardly upon said gripping of said bagging materials between the engagement means of respective pairs of stretch assemblies.

2. Improved apparatus as set forth in claim 1 in which said engagement means of said first and second pairs of stretch assemblies are engageable with said bagging material prior to engagement of said sealing jaws with said bagging material.

3. Improved apparatus as set forth in claim 1 in which each of said engagement means comprises a flat face the surface of which remains perpendicular to the movement of said sealing jaws throughout said outward movement of said engagement means.

4. Improved apparatus as set forth in claim 3 in which said flat face is provided by a resilient friction member which forms at least a portion of said engagement means.

5. Improved apparatus as set forth in claim 1 including biasing means biasing the engagement means of said first and second pairs of stretch assemblies inwardly toward each other when said engagement means are not engaging said bagging material.

6. Improved apparatus as set forth in claim 5 in which said biasing means comprises a spring member the end of which is connected to a respective stretch assembly and the opposite end of which is fixed relative to one of said pair of sealing jaws.

7. Improved apparatus as set forth in claim 1 in which said mounting means is attached to one of said pair of said sealing jaws for limited adjustment in a direction perpendicular to the movement of said sealing jaws.

8. Improved apparatus for forming, filling and sealing bags from a continuous supply of bagging material including a pair of sealing jaws transversely movable toward each other to engage said bagging material to form a transverse seal providing the top closure for a filled bag and a bottom closure for a succeeding bag, said improvement comprising stretch means attached to said sealing jaws, at opposite ends thereof, and engageable with opposing edges of said bagging material to provide opposing forces in directions perpendicular to the movement of said sealing jaws to flatten said bag and remove any wrinkles therefrom prior to said sealing by said sealing jaw, said stretch means comprises first and second pairs of strectch assemblies at each end of said pair of sealing jaws having engagement means thereon engageable with said bagging material, as said pair of sealing jaws move toward each other, so that a first edge of said bagging material is gripped between the engagement means of said first pair of stretch assemblies and a second and opposite edge of said bagging material is gripped between the engagement means of said second pair of stretch assemblies, said engagement means of said first and second pairs of stretch assemblies being forced outwardly in opposite directions perpendicular to said movement of said jaws to provide said opposing forces to said bagging material, the engagement means of said first and second pairs of stretch assemblies being disposed slightly above the transverse centerline of said sealing jaws, said stretch means comprising third and fourth stretch assemblies at each end of said pair of sealing jaws having engagement means also engageable with said bagging material, as said pair of sealing jaws move toward each other, so that said first edge of said bagging material is gripped between the engagement means of said third pair of stretch assemblies and said second and opposite edge of said bagging material is gripped between the engagement means of said fourth pair of stretch assemblies, the engagement means of said third and fourth pairs of stretch assemblies being disposed slightly below the transverse centerline of said sealing jaws.

* * * * *